3,249,558
METHOD FOR THE PREPARATION OF VANADIUM CATALYSTS
Kenneth K. Kearby, Watchung, N.J., assignor to Esso Research and Engineering Company, a corporation of Delaware
No Drawing. Filed Aug. 31, 1962, Ser. No. 220,906
4 Claims. (Cl. 252—464)

This invention relates to an improved method for the preparation of vanadium catalysts. Specifically, this invention pertains to the formation of stable vanadium solutions thereby allowing them to be used for impregnating supports with catalytically sufficient amounts of vanadium in a single pass operation. More specifically, this invention relates to the use of stable vanadium solutions containing less than the stoichiometric mol ratio of sodium hydroxide which can be used to impregnate supports to form catalyst compositions which compositions are especially effective in the oxidation of carbon monoxide and hydrocarbons found in the exhaust gases from internal combustion engines. However, they are equally applicable for other purposes where an oxidation catalyst is needed and other applications than that referred to specifically will suggest themselves to those skilled in the art.

The extremely severe conditions which prevail in the catalytic oxidation of carbon monoxide and hydrocarbons contained in the exhaust gases from internal combustion engines set unusually severe criteria for such catalysts which makes the selection of an effective catalyst extremely difficult. It is generally agreed that an effective catalyst should exhibit the following properties:

(a) Catalyst should be effective at a relatively low temperature so that it will function soon after the motor has started, i.e., it must have a short warm-up period.

(b) It should be highly efficient in oxidizing exhaust hydrocarbons and carbon monoxide.

(c) It should have a long life, i.e., (1) It should not be easily poisoned.
(2) It should withstand at least 1400° F. likely to develop during operation.
(3) It should not be abraded during the continual shaking and occasional shocks characteristic of moving vehicles.

Extensive research in this field has revealed that many catalysts will effectively oxidize the carbon monoxide and hydrocarbons contained in the exhaust gas from internal combustion engines. However, these catalysts have uniformly failed to be economically feasible in automotive afterburners due to their short life. The primary reason for this short life has been the ease with which these catalysts have been poisoned by the metallic compounds contained in the exhaust gases. Especially potent as a poison are the lead compounds formed from the anti-knock additives in the fuel.

It is therefore an object of the present invention to provide an improved method for the preparation of vanadium catalyst compositions. It is a further object to provide a method for the preparation of vanadium oxidation catalyst compositions which will be effective in the conversion of carbon monoxide and hydrocarbons found in automotive exhaust gases to carbon dioxide and water, said catalyst compositions having the property of being relatively resistant to the metallic poisons contained in the exhaust gases. It is a still further object to provide a method for the preparation of stable vanadium solutions so that higher concentrations of the metal can be impregnated on supports by a single operation.

Vanadium is not readily available as a soluble decomposable compound, as are the other metal or metal oxide oxidation catalysts. Vanadium is not available as a soluble nitrate, and its ammonium salt is only sparingly soluble. Vanadium catalysts therefore have been previously prepared by tedious multiple impregnations with ammonium meta vanadate or by using expensive complexing agents like oxalic acid. It has now been found that higher concentrations of vanadium can be put in solution by using sodium hydroxide in the mol ratio of (2 to 4)/1 ($NaOH/V_2O_5$), rather than the stoichiometric ratio of 6/1. A solution with a mol ratio of 3/1 is stable for 24 hours or more when using 17.7 g. $V_2O_5$ per 50 cc. of water, whereas a ratio of 6/1 gives a solution from which $Na_3VO_4 \cdot 16H_2O$ crystallizes almost immediately. Sodium hydroxide is a preferred solution reagent because of its low cost, but it will be understood that one may also use other alkali hydroxides, for example potassium hydroxide, is similar mol ratios to those specified for sodium hydroxide.

The highly concentrated solutions having a mol ratio of (2 to 4)/1 of $NaOH/V_2O_5$ may be used to impregnate supports which have previously been impregnated with an acid such as a mineral acid, e.g. $H_2SO_4$, HCl, $HNO_3$ or a strong organic acid, e.g. HCOOH, $CH_3COOH$. The soluble salts of copper, aluminum and silver may also be used to preimpregnate the supports. The amount of acid, metal salt or mixture thereof should be at least sufficient to neutralize the sodium ions present in the sodium hydroxide-vanadium oxide subsequently to be added. This will cause either a hydrous oxide of vanadium or an insoluble vanadate to precipitate onto the support. Alternatively one may first impregnate with the sodium vanadium oxide solution and then with the acid or precipitating salt solution. The soluble sodium salt may then be removed by washing, and the washed product dried and calcined.

Compositions prepared on an alumina or silica support by this method and containing copper and/or silver, with or without chromium oxide, are especially suitable for catalyzing the oxidation of carbon monoxide and hydrocarbons in automotive exhaust gases. Other supports which may be employed are magnesia, pumice, silicon carbide, graphite, zirconia and alumina silicates. However, supports prepared from an activated alumina are preferred.

The method of the present invention may be further illustrated by the following specific examples.

*Example 1*

A solution containing 120 g. of $CuSO_4 \cdot 5H_2O$ dissolved in water to a volume of 206 cc. was impregnated onto 216 g. of Alcoa F-1 activated alumina and 88 cc. of the solution was then drained off. The drained, copper impregnated alumina was dried at 350° F. It was then cooled and impregnated with 206 cc. of a solution containing 58.5 g. $V_2O_5$ in NaOH ($NaOH/V_2O_5$ mol ratio=3/1). The drained solids after removal of 92 cc. of solution, were dried at 300° F. They were then washed to remove most of the soluble sodium, dried and calcined for 3 hours at 1000° F. The use of a copper or silver salt as the precipitant minimizes the loss of soluble $V_2O_5$ during washing.

*Example 2*

Impregnation of 532 g. of Alcoa F-1 activated alumina was accomplished with 412 cc. of a sulfuric acid solution (53 cc. of conc. $H_2SO_4$ in $H_2O$). Draining removed 136 cc. of this solution. The alumina was dried at 350° F. and was then impregnated with 412 cc. of solution containing 117 g. $V_2O_5$ mol ratio $$NaOH/V_2O_5 = 3/1).$$

After draining off 141 cc., the solids were dried at 300°

F. overnight and then retreated with the 144 cc. of drained solution. After drying at 350° F., the product was washed six times with water and again dried. The gain in weight indicated a $V_2O_5$ content of about 10 percent. This product was divided into five parts and impregnated with metal nitrate solutions to add about 10% of the following oxides, one to each part: Cu, Ag, Cr, Co and Mn.

Example 3

The above five samples were calcined 3 hours at 1000° F. and then tested as catalysts for oxidizing carbon monoxide and isobutane. A fuel containing 2.4% CO, 0.17% iso-$C_4$, and 3.0% $O_2$ in $N_2$ was passed at 10,000 v./v./hr. over these catalysts at 1100° F. Conversions were determined, an 0.5 g. pellet of $PbBr_2$ was dropped on the hot catalyst and conversions again determined. Results are summarized below:

|  | Catalyst |  |  |  |  |
| --- | --- | --- | --- | --- | --- |
|  | 80% $Al_2O_3$+10% $V_2O_5$+ |  |  |  |  |
|  | 10% CuO | 10% $Ag_2O$ | 10% $Cr_2O_3$ | 10% CoO | 10% MnO |
| CO conv., percent | 100 | 100 | 74 | [1] 83 | 47 |
| HC conv., percent | 80 | 51 | 100 | [1] 93 | 71 |
| After adding 0.5 g. $PbBr_2$: |  |  |  |  |  |
| CO conv., percent | 100 | 53 | 48 | 53 | [1] 62 |
| HC conv., percent | 76 | 73 | 97 | 73 | [1] 82 |

[1] Temperature of 1200° F. instead of 1100° F.

The above results show that these catalysts have excellent resistance to poisoning in the presence of relatively large doses of lead. The high activity of the catalyst containing CuO for CO and that of the catalyst containing $CrO_3$ for isobutane indicates that a combination of these components would be a very effective and stable catalyst.

The amounts of vanadium oxide and the other metal oxides may be varied. They will usually be in the range of about 2–25% for each oxide. The vanadium oxide, copper oxide and chromium oxide contents are preferably 2.5 to 10%. The added silver oxide is usually 1–5%. When $CrO_3$ is used with $V_2O_5$, about 5% of each oxide forms a preferred composition, and preferably 5–10% of CuO or $Ag_2O$ is also included.

It should be noted that the method of this invention is equally applicable for all purposes where a vanadium oxidation catalyst is needed. Other applications than those referred to specifically will suggest themselves to those skilled in the art.

What is claimed is:

1. An improved method for the preparation of vanadium based internal combustion engine exhaust gas oxidation catalysts consisting essentially of impregnating an activated alumina support with a mineral acid, then impregnating with a solution containing sodium hydroxide and vanadium pentoxide having the respective molar ratio of from 2/1 to 4/1; washing to remove most of the sodium salts; thereafter impregnating the material with a solution of the salt of a metal oxidation catalyst and finally calcining the resulting composition.

2. The method of claim 1 wherein the sodium hydroxide to vanadium oxide molar ratio is about 3.

3. The method of claim 1 wherein the metal oxidation catalyst is selected from the class consisting of copper, silver, chromium, cobalt, manganese and their respective oxides.

4. The method of claim 3 wherein the metal oxidation catalyst is a copper-chromium mixture.

References Cited by the Examiner

UNITED STATES PATENTS

| | | | |
| --- | --- | --- | --- |
| 1,851,363 | 3/1932 | Jaeger | 252—456 XR |
| 1,935,054 | 11/1933 | Jaeger | 252—456 XR |
| 2,081,272 | 5/1937 | Foster | 252—464 XR |
| 2,206,377 | 7/1940 | Weiss | 252—464 XR |
| 2,374,932 | 5/1945 | Guyer | 252—464 XR |
| 2,911,359 | 11/1959 | Hansford | 252—464 XR |
| 3,000,908 | 9/1961 | Ruthruff | 252—456 XR |
| 3,025,132 | 3/1962 | Innes | 23—2.2 |

FOREIGN PATENTS 653,769  12/1962  Canada.

BENJAMIN HENKIN, *Primary Examiner.*

MAURICE A. BRINDISI, *Examiner.*